United States Patent [19]

Hansen

[11] 3,987,878
[45] Oct. 26, 1976

[54] RANGE SHIFT AND PARK LOCK CONTROL

[75] Inventor: Kenneth N. Hansen, Waukesha, Wis.

[73] Assignee: Allis-Chalmers Corporation, Milwaukee, Wis.

[22] Filed: Aug. 4, 1975

[21] Appl. No.: 601,844

[52] U.S. Cl. .......................... 192/4 A; 74/471 XY; 74/477
[51] Int. Cl.² ................... F16D 67/00; B60K 29/02
[58] Field of Search ............... 192/4 A, 4 B, 4 C; 74/471 XY, 473 P, 477

[56] References Cited
UNITED STATES PATENTS 3,241,640  3/1966  McCordie et al. ................. 192/4 A
3,800,924  4/1974  Hansen ............................ 192/4 A

*Primary Examiner*—Benjamin W. Wyche
*Attorney, Agent, or Firm*—Arthur L. Nelson

[57] ABSTRACT

A range shift and park lock control including a control lever, a range shift wafer and a park lock wafer pivotally supported in a housing with means for selectively and alternatively actuating either of the range shift or park lock wafers and associated mechanisms in the vehicle transmission.

10 Claims, 13 Drawing Figures

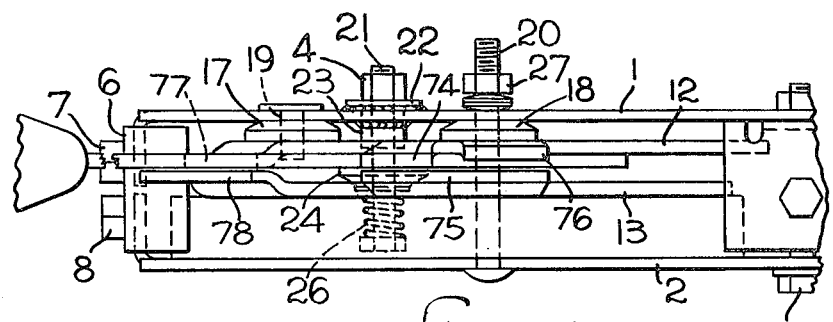
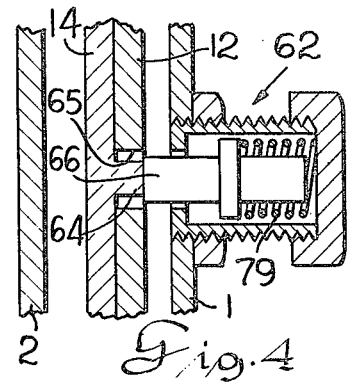
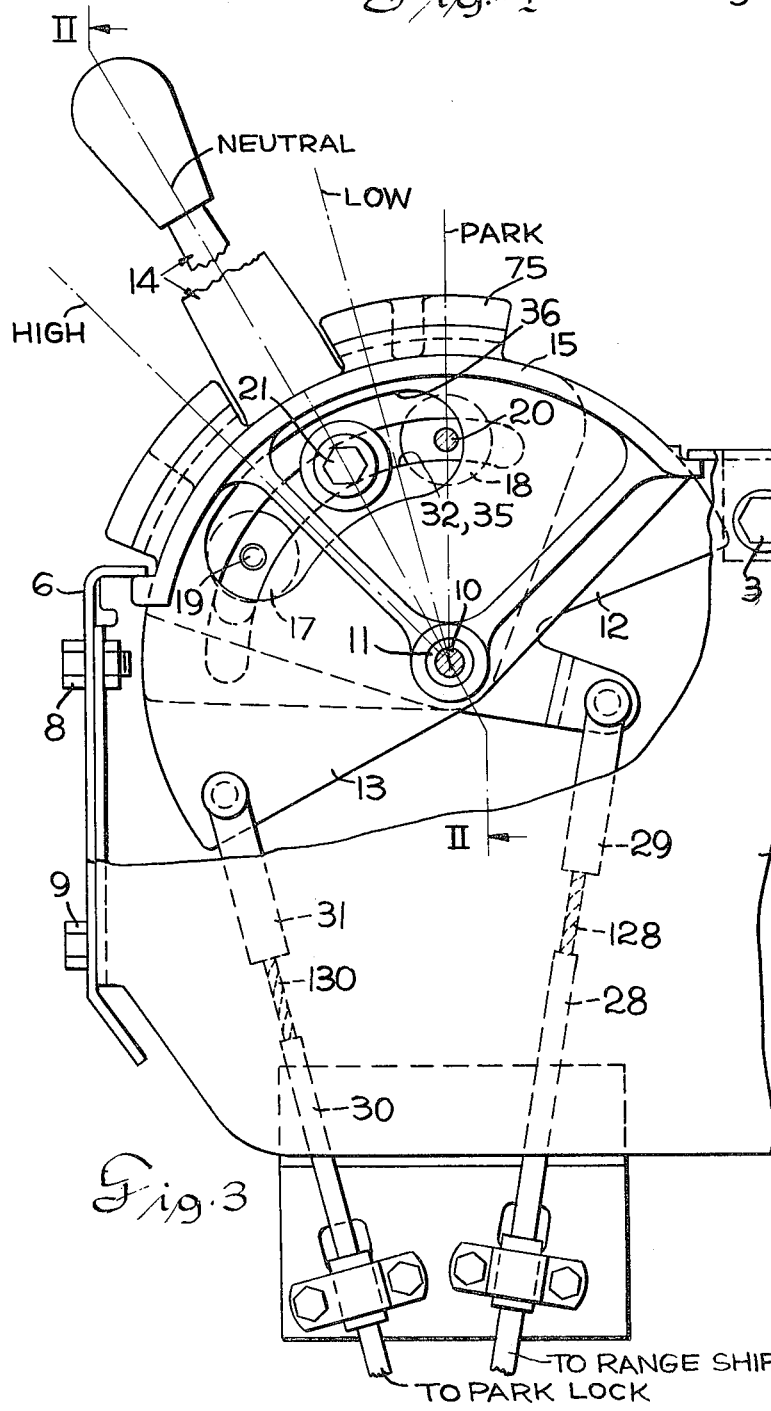
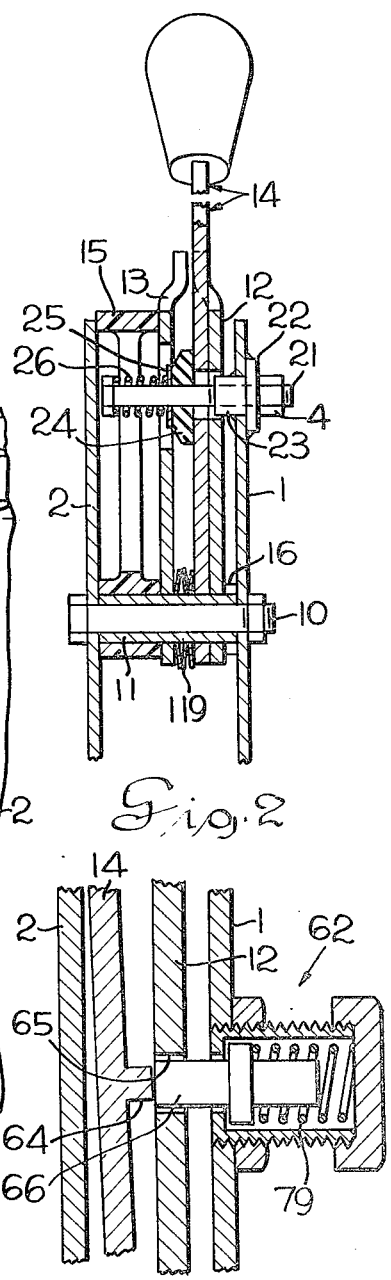

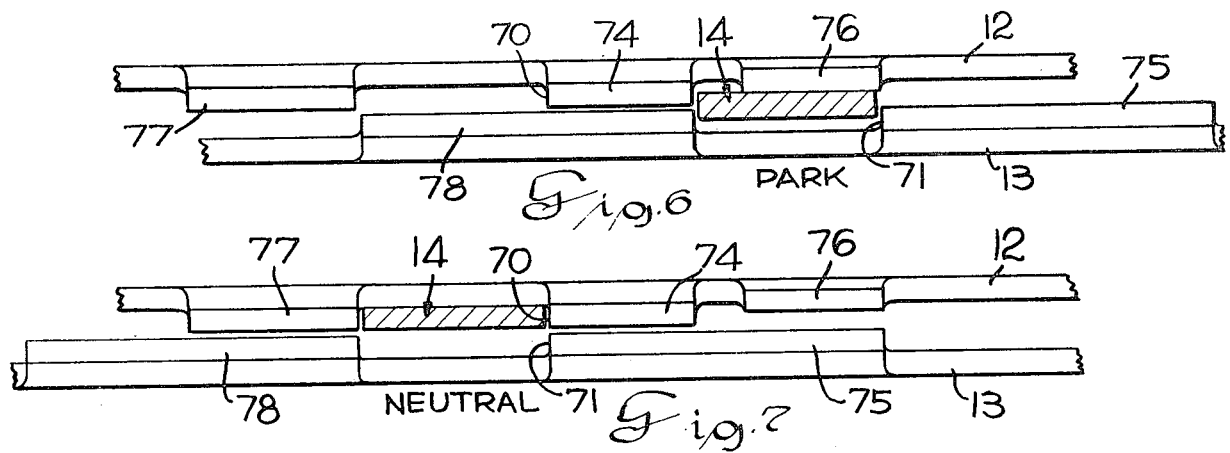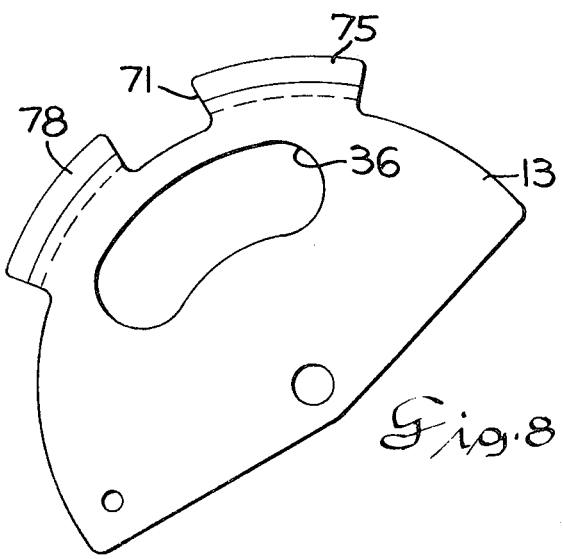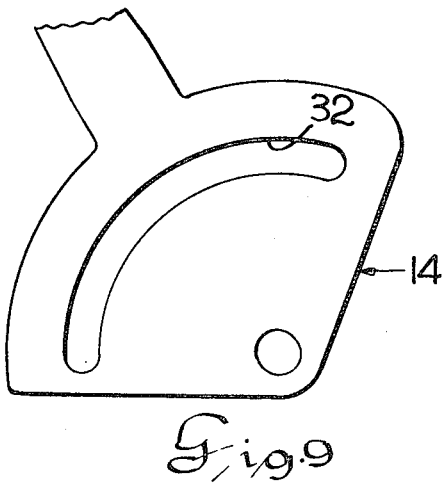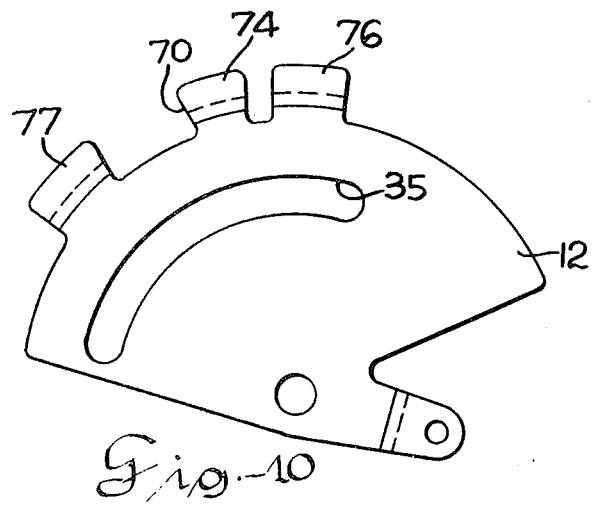

RANGE SHIFT AND PARK LOCK CONTROL

A tractor operating under various field conditions requires a multiple speed transmission to provide the suitable speeds and drawbar pull for the particular draft loads and conditions encountered. While a multiple speed transmission does provide a plurality of speeds for the tractor, the versatility of the tractor can greatly improve if a range shift transmission is used between the multiple speed transmission and the final drive assembly to double the vehicle operating speed ranges. A park lock for locking the drive shaft of the tractor when the tractor is parked is an added safety feature to assure adequate braking of the tractor. Accordingly, levers to provide these two operations may be provided in a control console on the tractor. Limited space requirements and convenience of operation are prime considerations.

Accordingly, this invention provides for a single control lever with a park lock wafer and a range shift wafer which can be selectively operated by the lever to control the range shift and park lock. In this manner, a single lever selectively operates one of these two functions since the vehicle is either parked or the park lock is released and the vehicle is operated for drive through the main transmission. A particular speed range of the range shift transmission is selected when the park lock is released and the vehicle is ready for operation.

Accordingly, it is an object of this invention to provide a range shift and park lock control on a tractor whereby a single lever is used to operate both functions.

It is another object of this invention to provide a range shift and park lock control through a control lever to selectively engage a range shift wafer or a park lock wafer connected through suitable operating mechanism in the transmission.

It is a further object of this invention to provide a range shift and park lock control with a single lever to selectively operate these controls and a detent means to assure that only one of the controls of the range shift or the park lock is operated at one time.

The objects of this invention are accomplished by providing a control lever with a park lock wafer and a range shift wafer pivotally supported on a common axis. A housing defining an elongated slot receives the lever and wafers to permit pivotal movement by selective engagement of one or the other of the wafers by the lever. A detent mechanism is provided to retain one or the other of the wafers in its inoperative position while the alternate wafer is being operated. The detent mechanism may be provided in the transmission or it may be provided in the housing and the control mechanism itself. The controls are positioned in a compact arrangement whereby the controls for the park lock and the range shift may be handled through a single lever which alternately provides whichever function is desired by the operator.

Referring to the drawings, the preferred embodiments of this invention are illustrated.

FIG. 1 illustrates a plan view of the range shift and park lock control;

FIG. 2 is a partial cross section view taken on line II—II of FIG. 3;

FIG. 3 is a side elevation view partially in section of the range shift and park lock control;

FIG. 4 is a cross section view showing a modification of a detent mechanism;

FIG. 5 is a cross section view of the modification showing the detent mechanism with the detent locking the range shift wafer with the housing;

FIG. 6 is a partial section view of the range shift and park lock control showing a portion of the mechanism and with the lever in the park lock position;

FIG. 7 is a partial section view showing the portion of the mechanism of the range shift and park lock control with the lever in the neutral range shift position;

FIG. 8 is a side view of the park lock wafer;

FIG. 9 is a side view of a portion of the control lever;

FIG. 10 is a side view of the range shift wafer;

Figure 11:
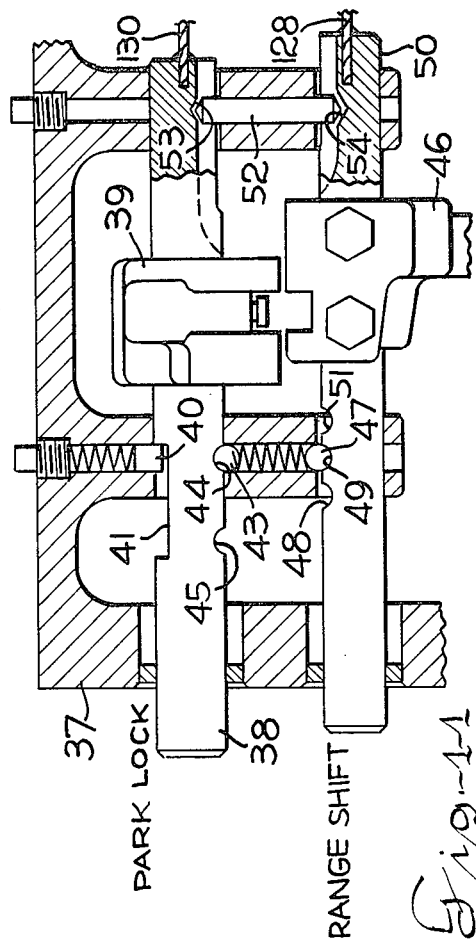
FIG. 11 is a cross section view showing the shift rail and park lock rail and the interlock and detents associated therewith.

Referring to the drawings, FIGS. 1, 2 and 3 generally illustrate the range shift and park lock control. The opposed side walls 1 and 2 are fastened together by means of the bolts 3 and 10. The end wall 6 is fastened by means of bolts 7, 8 and 9. The bolt 10 extends through the mechanism and carries the bushing 11 which pivotally supports the range shift wafer 12 and park lock wafer 13 as well as control lever 14. The spacer 15 is supported on the bushing 11 and is positioned between the park lock wafer 13 and the end wall 2.

The spacer 16 is carried on the sleeve 11 positioned in between the range shift wafer 12 and the side wall 1. Wear pads 17 and 18 are mounted on pins 19 and 20 which are supported on the side wall 1. The wear pads are positioned in between the side wall 1 and the range shift wafer 12.

The Belleville springs 119 are carried on the bushing 11 and position between the park lock wafer 13 and the control lever 14 biasing the control lever to an engaging position on its right-hand side as shown in FIG. 2 with the range shift wafer 12. Similarly, the bolt 21 is adjustably threaded in the integral flange 22 and sleeve 23 which is welded to sidewall 1. Lock nut 4 locks bolt 21 in its adjusted position to preset the spring tension on pressure pad 24. The bolt 21 extends through the pressure pad 24, washer 25 and spring 26. The spring 26 biases the pressure pad 24 against the control lever 14 to normally press the lever 14 to an engaging position with range shift wafer 12 that is shown in FIG. 2.

The bolt 20 and nut 27 extend through the wear pad 18. Bolt 10 extends through both side walls 1 and 2 and operates as a fastening means for the control assembly as well.

The range shift wafer 12 is connected to the cable 128 of sheathed cable 28 by means of a clevis 29. The cable 128 of sheathed cable 28 is adapted for connection to the shift rail 50 shown in FIG. 11. The park lock wafer 13 is connected to the cable 130 of the sheathed cable 30 by means of the clevis 31. Suitable connections for the cable sheaths to the chassis are provided so the rails can be operated by movement of the wafers.

The control lever 14 defines an arcuate slot 32 through which the bolt 30 extends and provides means for movement of the lever 14 as it is pivoted on its axis.

Similarly, the range shift wafer 12 is provided with a slot 35 through which the bolt 10 extends to permit the pivotal movement of the range shift wafer 12. The park lock wafer 13 is formed with an arcuate slot 36 through which the bolt 21 extends to permit the park lock wafer 13 to pivot on its pivotal axis.

Referring to FIG. 11, the transmission housing 37 is shown supporting the park lock rail 38 and the range shift rail 50. The park lock rail carries a carriage 39. A stop limit element 40 extends into the slot 41 to limit the reciprocal movement of the park lock rail 38. A detent 43 is also provided to define the two positions of the park lock rail 38. The detent 43 selectively engages the recess 44 or 45.

The range shift rail carries a shift fork 46. A detent 47 selectively engages the recesses 48, 49 and 51 to define the positions of the shift rail.

An interlock pin 52 selectively moves into slot 53 or 54 on the park lock rail 38 or the range shift 50 as either rail is operated.

The shift fork 46 operates a clutch collar 100 on clutch sleeve 101 used to selectively clutch the drive shaft 55 to an engaging or disengaging position in the transmission.

The carriage 39 carries a roller 156 which rolls on a ramp surface 56 to depress the arm 57 and engage the gear segment 58 with the gear 59 of the drive shaft 55. The latch lever 60 is normally biased to a disengaging position by the spring 61.

FIGS. 4 and 5 show an optional detent 62 positioned on the side wall 1. The detent selectively engages the range shift wafer 12 shown in FIG. 5 and the detent 62 is inactive by means of the button 64 when the control lever 14 is in the position shown in FIG. 4. When the button 64 is withdrawn from the opening 65, the detent pin 66 moves into the opening and locks the range shift wafer 12 to the wall 1. The side wall 2 is shown in spaced relation to the control lever 14.

The operation of this device will be described in the following paragraphs.

Referring to FIGS. 1, 2, 3, and 7, the control lever 14 is shown in the neutral position. The lever 14 is normally pressed against the range shift wafer 12 and can be selectively moved in a clockwise or counterclockwise direction as viewed in FIG. 3. The detent 47 normally holds the range shift rail 50 in the neutral position. As the control lever 14 is moved forwardly in the counterclockwise direction to the high speed position and the range shift rail 50 is moved rearwardly and the detent 47 moves to the recess 48 as the range shift rail is positioned in the high speed shift position.

As the control lever 14 is moved in the clockwise direction the range shift wafer 12 is carried with the control lever 14 since the lever is positioned in the slot 70 and the cable 128 moves downwardly. As the cable 128 moves downwardly, the shift rail 50 moves forwardly and the detent 47 moves to the recess 49 in the neutral position. When the shift rail moves beyond its neutral position the interlock pin 52 is again forced out of the recess 54 and into the recess 53 to thereby lock the park lock rail 38 from moving axially. When the lever 14 is moved to the extreme clockwise position or low speed position, the detent 47 is positioned in the recess 51.

Figure 13:
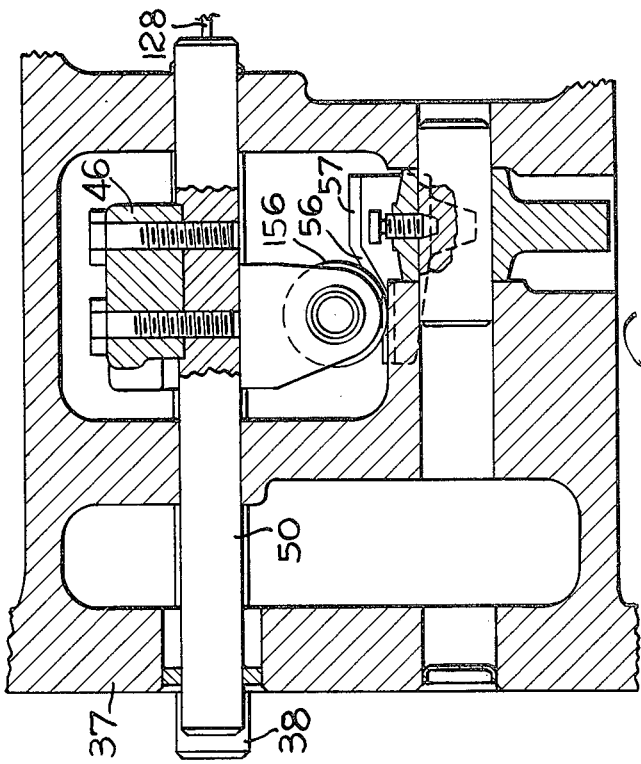
FIG. 13 is a cross section view showing the park lock carriage on the park lock rail of the transmission taken on line XIII—XIII of FIG. 12.
Figure 12:
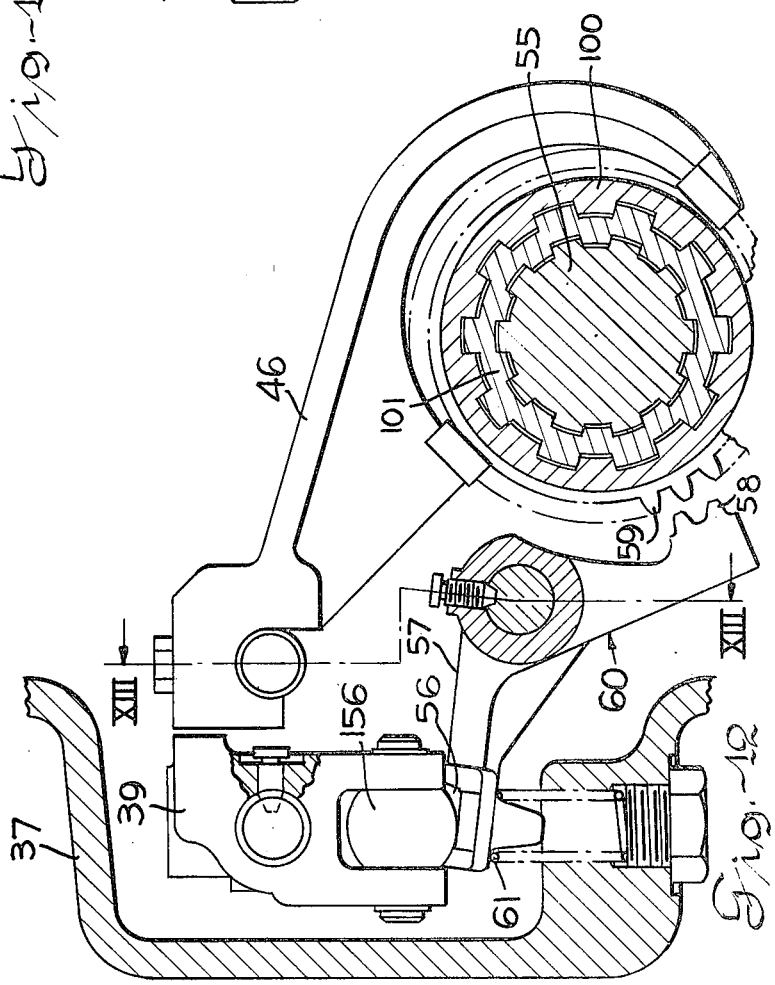
FIG. 12 is a cross section view of the shift rail and the park lock rail and mechanism and shifting fork in the transmission.

When it is desired to operate the park lock wafer 13, the control lever 14 is moved from the neutral position and the lever is then pressed to the left as viewed in FIG. 2. The lever compresses the spring 26 and is received in the slot 71 of the park lock wafer 13. The control lever 14 can then be moved in the clockwise direction as viewed in FIG. 3 causing the carriage 39 to move in the right-hand direction as viewed in FIG. 13 and causing the roller 156 to ride up on the ramp 56 to the level surface 57 as shown in FIG. 13. This in turn causes the pawl lever 60 to move the gear segment 58 into the teeth of gear 59 on the drive shaft 55. This locks the drive shaft 55.

The lever 14 can be moved in the clockwise direction as viewed in FIG. 3 to the position shown in FIG. 6 where the lever 14 engages the tab 74 on the range shift wafer. The tabs 75 and 78 on the park lock wafer 13 engage the lever 14 while the lever rests against the tab 76 on the range shift wafer 12. Since the horizontal surface 57 on the pawl lever 60 is parallel with the axis of the park lock rail 38 and the pivotal axis of the pawl lever 60, there is no component of force tending to disengage the park lock. Also, the interlock pin 52 maintains the range shift rail 50 in its neutral position and the linkage between the range shift rail and the range shift wafer 12 maintains the wafer 12 in its position, and accordingly the tab 74 locks the lever 14 in this position. This position is shown in FIG. 6.

When the park lock is released, the control lever 14 is moved away from the tabs 76 and along the tab 74 to the neutral position between the tabs 77 and 74. The biasing force of the spring 26 biases the lever to a position between the tabs 74 and 77 on the range shift wafer 12.

FIGS. 4 and 5 show an optional detent mechanism which is built into the control mechanism for the range shift and park lock. The detent 62 has a detent pin 66 which is normally biased into the opening 65 by the spring 79. The detent pin in this position locks the range shift wafer 12 from rotation about its rotational axis as shown in FIG. 5, and in this position the lever is free to move into the park lock position and the tab 74 will lock the control lever in the park lock position.

When the control lever is moved to the return position as shown in FIG. 4, the biasing force of the spring 26 causes the button 64 to move into the opening 65 pressing the detent pin 66 out of the opening 65 and the range shift wafer 12 is free to rotate on its axis with the control lever.

The embodiments of the invention in which an exclusive property or privilege is claimed are defined as follows:

1. A park lock and range shift transmission control comprising, a control lever, a park lock wafer and a range shift wafer on opposing sides of said lever, a housing including, opposed side walls forming an elongated slot receiving said lever and said wafers, pivotal support means in said housing pivotally supporting said lever and said wafers, a park lock mechanism for operating a vehicle park lock in a transmission, a range shift mechanism for shifting a range shift in the transmission, means connecting said park lock wafer to said park lock mechanism, means connecting said range shift wafer to said range shift mechanism, radial tabs extending axially to form wear surfaces between said wafers and axially space said wafers to position said lever between said wafers, said tabs forming radial slots on each of said wafers for selectively and alternatively receiving said lever for selective and alternative rotation of one of each of said wafers for operation of said range shift and park lock wafers.

2. A park lock and range shift transmission control as set forth in claim 1 including resilient means between one of said wafers and said lever biasing said lever against the other of said wafers.

3. A park lock and range shift transmission control as set forth in claim 1 including, a pressure pad, means supporting said pressure pad including a bolt and a spring mounted on a side wall and extending through said lever and said wafers biasing said lever axially, means defining arcuate slots in said lever and said wafers permitting relative movement of said lever and said wafers relative to said side wall when said control lever is operated.

4. A park lock and range shift transmission control as set forth in claim 1 including, a detent on said housing and connected to said range shift wafer for releasing said range shift wafer when said lever is operating said range shift wafer and locking said range shift wafer to said housing when said park lock wafer is operated.

5. A park lock and range shift transmission control as set forth in claim 1 including, a detent mounted on said first side wall selectively locking said range shift wafer with said first side wall when said lever is operating said park lock wafer.

6. A park lock and range shift transmission control as set forth in claim 1 wherein said range shift wafer includes three radial tabs, the first of said three tabs defining a radial slot for receiving said control lever to operate said range shift wafer, a third of said three tabs defining a notch for engaging said control lever for locking said control lever and park lock wafer when said park lock wafer is in the park position.

7. A park lock and range shift transmission control as set forth in claim 1 wherein said park lock wafer defines a pair of tabs extending radially and axially and forming a slot for receiving said control lever to selectively and alternatively operate said park lock wafer.

8. A park lock and range shift transmission control as set forth in claim 1 including means normally biasing said lever into the slot formed by said range shift wafer, a detent means on said range shift normally retaining said range shift wafer in the neutral position.

9. A park lock and range shift transmission control as set forth in claim 1 including means normally biasing said lever into the radial slot formed by said range shift wafer.

10. A park lock and range shift transmission control as set forth in claim 1 wherein said park lock includes a park lock rail reciprocably mounted in a transmission housing, said range shift includes a range shift rail reciprocably mounted in parallel with said park lock rail in said transmission housing, an interlock between said rails for selectively and alternatively allowing one of said rails to shift at a time, an axially extending tab on park lock wafer to latch said lever and prevent pivotal movement of said lever when said range shift wafer is in the park position to thereby lock said range shift wafer when said control lever engages the tab on said range shift wafer.

* * * * *